United States Patent Office 3,056,726
Patented Oct. 2, 1962

3,056,726
α-ETHYL-β-METHYLVALERAMIDE FOR MENTAL HYPERIRRITABILITY
David F. Marsh, deceased, late of Lafayette Hill, Pa., by Audrey S. Marsh, executrix, San Francisco, Calif., assignor to McNeil Laboratories, Incorporated, Philadelphia, Pa., a corporation of Pennsylvania
No Drawing. Filed Mar. 22, 1960, Ser. No. 16,666
2 Claims. (Cl. 167—65)

The present invention relates to a novel medicinal composition for the relief of mental hyperirritability and to a method of treating individuals suffering from mental hyperirritability; and, more particularly, the present invention relates to a novel medicinal composition capable of producing a tranquilizing effect without producing sedation, hypnosis, or narcosis. The present application is a continuation-in-part of application Serial No. 679,074, filed August 19, 1957, now abandoned.

There are presently available certain drugs known to have a tranquilizing effect. These tranquilizing drugs, however, also produce a certain amount of sedation, that is, drowsiness, mental depression or loss of mental acuity.

According to the literature α-ethyl-β-methylvaleramide was tested on fish, frogs, mice and rabbits in which it was found to produce profound narcosis, and, in small doses in rabbits and mice, stimulation of respiration (L. G. Merkulov, Archives des Sciences Biologiques, vol. 42, p. 77, 1936; English summary at page 143; Chem. Abstracts, vol. 31, p. 8027, 1937).

It has been found, however, that α-ethyl-β-methylvaleramide unexpectedly produces in humans suffering from mental hyperirritability a tranquilizing effect without any narcosis or even sedation or hypnosis.

It is the principal object of the present invention to provide a novel medicinal preparation for the relief of mental hyperirritability in humans.

It is another object of the present invention to provide a novel method of treatment for the relief of mental hyperirritability in humans.

A further object is to provide a novel medicinal preparation for the relief of mental hyperirritability in humans without producing sedation, hypnosis, narcosis, and the like.

Other objects, including the provision of a novel medicinal preparation and method of treatment for relieving mental hyperirritability and spasticity in humans suffering from the same, will become apparent from the consideration of the following specification and claims.

The medicinal preparation of the present invention comprises, in oral dosage unit form, α-ethyl-β-methylvaleramide in a pharmaceutical carrier adapted for human oral ingestion, the α-ethyl-β-methylvaleramide being present in an amount between about 10 and about 250 milligrams per oral dosage unit.

The method of the present invention comprises administering orally to individuals suffering from mental hyperirritability, a composition in oral dosage unit form comprising a pharmaceutical carrier adapted for human oral ingestion and between about 10 and about 250 milligrams of α-ethyl-β-methylvaleramide per oral dosage unit.

As stated, it has been found that α-ethyl-β-methylvaleramide produces, in humans suffering from hyperirritability, a tranquilizing effect without sedation. That is to say, the administration of the α-ethyl-β-methylvaleramide produces, in persons suffering from mental hyperirritability, a calming effect, i.e. a state of detached serenity, without producing drowsiness, mental depression or loss of mental acuity as is associated with sedation. At dosage levels producing the stated tranquilizing effect, there is not produced, in humans, hypnosis or narcosis. In the case of humans, therefore, the compound appears to be a true psychic deafferentating agent. The state of mental hyperirritability treated in accordance with the present invention may be produced or manifested by anxiety, tension, undue apprehension, emotional excitement, agitation, aggression, and the like. As will appear hereinafter, individuals suffering from mental hyperirritability associated with spasticity are particularly benefited by the composition and treatment of the present invention.

In preparing the compositions of the present invention the α-ethyl-β-methylvaleramide will be combined with a significant amount of a pharmaceutical carrier adapted for human oral ingestion. The composition may be in the form of an elixir, a suspension, powder adapted for suspension in liquid media, tablet or capsule. Any of the usual pharmaceutical carrier media adapted for oral administration may be employed, such as gelatin, in the case of capsules; various combinations of water, glycols, oils, alcohol, and the like, in the case of elixirs and suspensions; starches, sugars, kaolin, salts, lubricants, binders, and the like, in various combinations, in the case of powders and tablets. Tablets represent the most advantageous and preferred oral dosage form.

The compositions, in order to provide the novel stated effects in humans, should contain between about 10 and about 250 milligrams of the α-ethyl-α-methylvaleramide per dosage unit, and in most cases in practice there will be between about 50 milligrams and about 200 milligrams of the compound per dosage unit form.

The present invention will be more readily understood from a consideration of the following specific examples which are given for the purpose of illustration only and are not intended to limit the scope of the invention in any way.

Example I

A mixture of 1952 g. (8 moles) of diethyl ethyl-sec.-butylmalonate, 2250 g. (40 moles) of potassium hydroxide, 2100 cc. of water and 1200 cc. of 95% ethyl alcohol is stirred and refluxed for eight hours. The mixture is set up for distillation and the alcohol is removed at water pump pressure. The mixture is treated with 1500 cc. of water and concentrated by distillation under reduced pressure. The basic solution is cooled and extracted with ether to remove any unreacted malonate. The aqueous layer is cooled and treated with 1200 cc. of concentrated sulfuric acid and 2000 cc. of water and extracted with ether. The ether extract is evaporated and the oil is dried by benzene distillation. The dry oil is heated to 150–160° for three hours (gas evolution is vigorous when the temperature first reaches 155°). The temperature is then raised to 200° where it is maintained for twenty hours. The oil is distilled to yield several fractions with B.P. 190–225°, probably a mixture of the desired acid and its ethyl ester. The fractions are all combined and the 1050 g. (7.3 moles) of oil are treated with a solution of sodium hydroxide prepared by dissolving 350 g. (8+ moles) of sodium hydroxide in 2500 cc. of water. The basic solution is extracted with ether and the aqueous layer is acidified with concentration sulfuric acid. The acid solution is extracted with ether. The ether extract is evaporated and the residue distilled. The fractions with B.P. 214–225° and $n_D^{27}$ 1.4240 to $n_D^{27}$ 1.4272 are combined to provide the α-ethyl-β-methylvaleric acid.

A 702 g. (4.8 mole) sample of α-ethyl-β-methylvaleric acid is stirred and treated with 590 g. (5 moles) (369 cc.) of thionyl chloride. The solution is heated to 40° after 200 cc. of thionyl chloride are added. After all the thionyl chloride is added, the solution is refluxed for one hour and then distilled to provide α-ethyl-β-methylvaleryl chloride, B.P. 85–95° C., at water pump pressure.

Two liters of aqueous ammonia (28%) are treated with 754 g. (4.5 moles) of α-ethyl-β-methylvaleryl chloride with stirring and cooling so that the temperature does not rise above 15° during the addition. After all the acid chloride is added, the solution is stirred for one hour and then allowed to stand at room temperature overnight. The solid is collected by filtration, washed with two portions of water and recrystallized twice from acetone-water. The product is pushed through a #20 screen, stirred with two liters of 5% sodium carbonate solution, collected by filtration and washed with water to provide α-ethyl-β-methylvaleramide, M.P. 114–115.5°.

The calculated nitrogen analysis for $C_8H_{17}NO$ is: N, 9.78; that found is: N, 9.80.

*Example II*

The following formula may be employed for preparing 1350 tablets (4 grains) each containing 100 milligrams of α-ethyl-β-methylvaleramide:

| | |
|---|---|
| α-Ethyl-β-methylvaleramide | 4 oz., 396 grains. |
| Calcium phosphate dibasic | 3 oz. |
| Starch (filler) | 1 oz., 129 grains. |
| Starch (granulating agent) | 39 grains. |
| Starch (disintegrating agent) | 3 oz. |
| Calcium stearate | 25 grains. |

Homogeneous aqueous suspensions of α-ethyl-β-methylvaleramide may be prepared, for example by using .5%, by weight, of sodium carboxymethylcellulose and 8%, by weight, of polyethylene glycol-300.

Illustrative of the pharmaceutical activity of α-ethyl-β-methylvaleramide are the following cases:

A. A 15 lb. male, age one year, markedly hyperirritable as manifested by continuous crying and with spastic quadriplegia received 50 milligrams of α-ethyl-β-methylvaleramide, in the form of one-half of a scored 100 milligram tablet crushed in water. After three-quarters of an hour his extreme irritability had disappeared, his crying ceased, he regarded his environment with interest and was alert to his surroundings. In addition, all four extremities, formerly extremely spastic, became relaxed so that they could readily be flexed and extended.

B. A 16½ lb. female, age 10 months, severely spastic in all four extremities and hyperirritable, was given 100 milligrams of α-ethyl-β-methylvaleramide, in the form of a crushed 100 milligram tablet in water (a dose of 10 milligrams per kilogram of body weight). Following administration her irritable condition ceased and all four extremities, formerly extremely spastic, became satisfactorily relaxed.

C. A 50 lb. female, aged 15 years, extremely irritable with spastic quadriplegia was given 100 milligrams of α-ethyl-β-methylvaleramide in the form of a 100 milligram tablet crushed in water. A definite change in the musculature was noted one hour later, the duration being approximately 3 hours. In addition, the patient showed markedly decreased irritability.

D. A 30 lb. male, age 3 years, with left hemiplegia and retardation was given 50 milligrams of α-ethyl-β-methylvaleramide, in the form of one-half of a scored 100 milligram tablet crushed in water. Following administration a definite muscle relaxation was noted. Spasticity on the involved side responded by relaxation, but normal function was maintained on the uninvolved side.

E. A 35 lb. female, age 3½ years, with hyperirritability associated with spastic quadriplegia was given 100 milligrams of α-ethyl-β-methylvaleramide in the form of a 100 milligram tablet crushed in water. Irritability was substantially decreased.

Numerous acute toxicity tests have shown that α-ethyl-β-methylvaleramide is no more toxic than meprobamate, a well known commercial tranquilizing drug, and is less toxic than butabarbital and ethchlorvynol.

Numerous tests have been conducted on lower animals including mice, rats, hamsters, cats, dogs and monkeys. Hostile and aggressive rhesus monkeys are tamed so that the animals show no hostility toward the operator. The treated monkeys exhibit no fear and yet retain alertness to sensory stimuli, good appetite and full awareness of their environment. The calmness produced in the monkeys lasts as long as 24 hours. In the treated monkeys there is none of the catatonia which is observed in the monkey following administration of chlorpromazine and reserpine.

What is claimed is:

1. The method of relieving mental hyperirritability in humans without producing sedation which comprises administering orally to humans suffering from mental hyperirritability a composition in oral dosage unit form comprising a pharmaceutical carrier adapted for human oral ingestion and between about 10 and about 250 milligrams of α-ethyl-β-methylvaleramide per dosage unit.

2. The method of claim 1 wherein the composition contains between about 50 and about 200 milligrams of α-ethyl-β-methylvaleramide per dosage unit.

References Cited in the file of this patent

Merkulov: C.A. 31, p. 8027 (7), 1937.
Burger: Medicinal Chemistry, 1, pp. 132–133, 1951, Interscience Publishers, Inc.